(12) United States Patent
Nakagawa (10) Patent No.: US 10,371,260 B2
(45) Date of Patent: Aug. 6, 2019

(54) OIL SEAL

(71) Applicant: NOK CORPORATION, Tokyo (JP)

(72) Inventor: Takehiro Nakagawa, Fukushima (JP)

(73) Assignee: NOK Corporation (JP)

(*) Notice: Subject to any disclaimer, the term of this patent is extended or adjusted under 35 U.S.C. 154(b) by 545 days.

(21) Appl. No.: 14/437,458

(22) PCT Filed: Sep. 4, 2013

(86) PCT No.: PCT/JP2013/073749
§ 371 (c)(1),
(2) Date: Apr. 21, 2015

(87) PCT Pub. No.: WO2014/065014
PCT Pub. Date: May 1, 2014

(65) Prior Publication Data
US 2015/0285380 A1  Oct. 8, 2015

(30) Foreign Application Priority Data

Oct. 23, 2012 (JP) .................................. 2012-233637

(51) Int. Cl.
*F16J 15/32* (2016.01)
*F16J 15/00* (2006.01)
(Continued)

(52) U.S. Cl.
CPC ........... *F16J 15/002* (2013.01); *F16J 15/164* (2013.01); *F16J 15/32* (2013.01); *F16J 15/3204* (2013.01);
(Continued)

(58) Field of Classification Search
CPC .................................................. F16J 15/3244
See application file for complete search history.

(56) References Cited

U.S. PATENT DOCUMENTS 3,501,155 A * 3/1970 Dega ................... F16J 15/3244
                                                    277/309
3,640,542 A * 2/1972 Mowat ................ F16J 15/3244
                                                    277/559
(Continued)

FOREIGN PATENT DOCUMENTS

CN      201954002 U    8/2011
CN      102537357 A    7/2012
(Continued)

OTHER PUBLICATIONS

Extended European Search Report for Patent Application No. EP 13848564.4, dated Sep. 24, 2015 (7 pages).

*Primary Examiner* — Vishal A Patel
(74) *Attorney, Agent, or Firm* — Harness, Dickey & Pierce, P.L.C.

(57) ABSTRACT

A slinger of an oil seal has a thread groove carrying out a pumping action toward a diametrically outer side in an external side end surface of a flange portion. A lip seal member has a main lip, a rubber-like elastic dust lip and a rubber-like elastic intermediate lip. The intermediate lip directs a lip end to a machine inner side, comes into close contact with the slinger over a whole periphery with the lip end, and has annular first projections and circumferentially partial second projections in a facing portion to the slinger. The first projection has a structure which makes dust hard to pass through to the lip end by forming a micro gap in relation to the slinger. The second projection has a structure which properly keeps the micro gap under generation of eccentricity in a rotary shaft by having a higher portion than the first projection.

10 Claims, 4 Drawing Sheets

(51) Int. Cl.
*F16J 15/16* (2006.01)
*F16J 15/3244* (2016.01)
*F16J 15/3264* (2016.01)
*F16J 15/3204* (2016.01)
*F16J 15/44* (2006.01)

(52) U.S. Cl.
CPC ....... *F16J 15/3244* (2013.01); *F16J 15/3264* (2013.01); *F16J 15/44* (2013.01)

(56) References Cited

U.S. PATENT DOCUMENTS

| | | | | |
|---|---|---|---|---|
| 3,984,113 | A * | 10/1976 | Bentley | F16J 15/3244 277/559 |
| 5,645,283 | A | 7/1997 | Drucktenhengst et al. | |
| 6,029,980 | A * | 2/2000 | Downes | F16J 15/322 277/552 |
| 6,045,138 | A * | 4/2000 | Kanzaki | F16J 15/164 277/560 |
| 6,857,636 | B2 * | 2/2005 | Bengoa | F16J 15/3244 277/549 |
| 2002/0081212 | A1 * | 6/2002 | Yamada | F16J 15/3232 417/222.2 |
| 2005/0104299 | A1 * | 5/2005 | Iketani | F04D 29/049 277/309 |
| 2008/0088094 | A1 * | 4/2008 | Borowski | F16C 33/74 277/559 |
| 2009/0127791 | A1 * | 5/2009 | Buro | F16J 15/008 277/352 |
| 2010/0025938 | A1 * | 2/2010 | Berdichevsky | F16J 15/3264 277/562 |
| 2011/0018209 | A1 * | 1/2011 | Dahlhaus-Preussler | D06F 37/00 277/562 |
| 2011/0095486 | A1 * | 4/2011 | Nakagawa | F16J 15/324 277/549 |

FOREIGN PATENT DOCUMENTS

| | | | |
|---|---|---|---|
| DE | 10334896 A1 | 3/2005 | |
| JP | H04-027262 U | 3/1992 | |
| JP | H07-208610 A | 8/1995 | |
| JP | H07-208611 A | 8/1995 | |
| JP | H08-254213 A | 10/1996 | |
| JP | H10-115375 A | 5/1998 | |
| JP | 2001027326 A * | 1/2001 | ............. F16J 15/008 |

* cited by examiner

OIL SEAL

CROSS-REFERENCE TO RELATED APPLICATIONS

This application is a 371 U.S. National Stage Application of International Application No. PCT/JP2013/073749, filed on Sep. 4, 2013, and published in Japanese as WO 2014/065014 A1 on May 1, 2014. This application claims priority to Japanese Application No. 2012-233637, filed on Oct. 23, 2012. The entire disclosures of the above applications are incorporated herein by reference.

BACKGROUND OF THE INVENTION

Field of the Invention

The present invention relates to an oil seal which is one kind of a sealing device according to a seal technology. The oil seal according to the present invention is used, for example, an automobile (engine) relevant field, or is used in a general industrial machinery field.

Description of the Conventional Art

Figure 4:
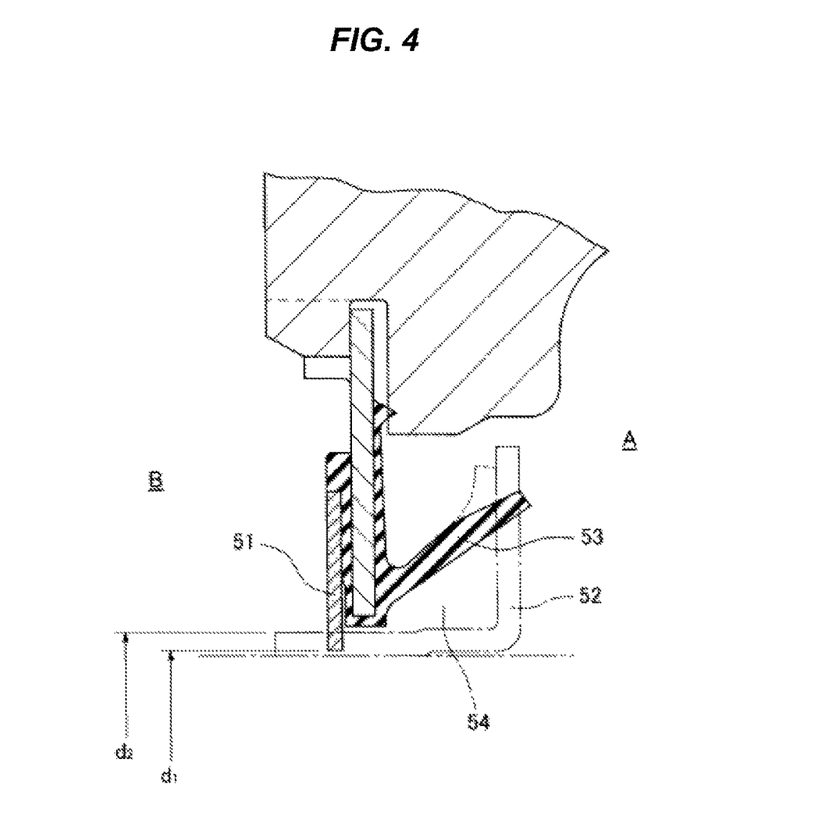
FIG. 4 is a cross sectional view of a substantial part of an oil seal according to a prior art.

An oil seal using a fabric 51 as a dust lip has been conventionally known as shown in FIG. 4, and the oil seal is used, for example, for sealing around a crank shaft in a field of an automobile engine (a diesel engine).

In this prior art, an initial inner diameter (an inner diameter before insertion of a slinger 52) d1 of the fabric 51 is set to be smaller than an outer diameter d2 of a fabric sliding portion in the slinger 52, whereby the fabric 51 has a fastening margin. The fabric 51 is structured such that the fabric 51 is expanded along the slinger 52 when the slinger 52 is inserted, thereby securing a contact width with the slinger 52.

Therefore, since the fastening margin of the fabric 51 is set great so that the fabric 51 can be uniformly expanded circumferentially, and since an elongation load of the fabric 51 itself is high and a tense force becomes high, a sliding torque of the fabric is high, thereby preventing an improvement of fuel efficiency.

Further, since the fabric 51 has a breathability, the fabric 51 has the following advantages and disadvantages.

Advantages

In the case of generation of such a condition that a pressure in a space 54 between the fabric 51 and a main lip 53 is lowered, the fabric 51 intakes (passes) an air (an atmospheric air) in an external side B and the reduction of the pressure is suppressed. Therefore, it is possible to inhibit the pressure in the space 54 between the fabric 51 and the main lip 53 from being lowered and inhibit the main lip 53 from coming into entire contact with the slinger 52 (an advantage on the basis of the air intake of the fabric).

Disadvantages

An air leak inspection may be carried out at the shipping time of the oil seal, and the inspection is generally carried out by applying a positive pressure from a machine inner side and measuring an amount of air leakage in the fabric 51 side. In this case, since the fabric 51 discharges (passes) the air in the prior art, the amount of leakage does not come to zero even in the case that the oil seal is normal. Therefore, it is necessary to carry out the inspection in a state in which a leakage allowable value is set, and it is impossible to carry out a simple inspection in which a leakage threshold value is set to zero (a disadvantage caused by the air discharge of the fabric).

SUMMARY OF THE INVENTION

Problem to be Solved by the Invention

The present invention is made by taking the above points into consideration, and an object of the present invention is to provide an oil seal which can reduce a sliding torque in comparison with a case that a fabric is used as a dust lip, and can dissolve the disadvantage caused by the air discharge of the fabric.

Means for Solving the Problem

In order to achieve the object mentioned above, an oil seal according to the present invention is an oil seal constructed by a combination of a lip seal member which is fixed to an inner periphery of a shaft hole of a housing and a slinger which is fixed to a rotary shaft inserted to the shaft hole, and inhibiting a dust in an external side from entering into a machine inner side as well as inhibiting a sealed fluid in the machine inner side from leaking to the external side, wherein the slinger is integrally provided with a tubular portion which is fitted to the rotary shaft and a flange portion which is formed so as to rise up toward an outer side in a diametrical direction from the tubular portion, and is provided with a thread groove which carries out a pumping action toward an outer side in a diametrical direction in an end surface in an external side of the flange portion, the lip seal member is provided with a main lip which slidably comes into close contact with the end surface in the external side of the flange portion in the slinger so as to seal the sealed fluid, a dust lip which is arranged in an external side of the main lip and is constructed by a rubber-like elastic body, and an intermediate lip which is arranged at an intermediate position between the main lip and the dust lip and is constructed by the rubber-like elastic body in the same manner, the intermediate lip slidably directs its lip end to a machine inner side, comes into close contact with an outer peripheral surface of a tubular portion in the slinger over a whole periphery with the lip end and is provided with an annular first projection and a circumferentially partial second projection in a facing portion to the outer peripheral surface of the tubular portion in the slinger, the first projection is provided with a structure which makes the dust hard to pass through toward the lip end by forming a micro gap in relation to the outer peripheral surface of the tubular portion in the slinger, and the second projection is provided with a structure which properly keeps the micro gap in the case that any eccentricity is generated in the rotary shaft by having a higher position than the first projection.

In the oil seal according to the present invention having the structure mentioned above, the dust lip is constructed by the rubber-like elastic body in place of the fabric, and the dust lip constructed by the rubber-like elastic body can be formed thin and tends to elastically deform. As a result, the tense force can be reduced in spite of the same fastening margin as that of the fabric. Therefore, it is possible to reduce the sliding torque of the dust lip.

Further, in the present invention, the disadvantage caused by the air discharge of the fabric can be dissolved as follows.

More specifically, in the present invention, since the thread groove carrying out the pumping action toward the outer side in the diametrical direction is provided in the end surface in the external side of the flange portion in the slinger as mentioned above, an excellent seal effect is applied to the sealed fluid in the machine. However, since an air flow passage is formed through the thread groove in the case that the thread groove is provided, the air flowing through the air flow passage is sensed as the leakage in the case that the air leak inspection is carried out at the oil seal shipping time.

In relation to this, the intermediate lip is arranged between the main lip and the dust lip, and the intermediate lip directs its lip end to the machine inner side and comes into close contact with the slinger over the whole periphery with the lip end. Therefore, the intermediate lip dams the air entering into the inner portion of the oil seal through the thread groove on the way without reaching the dust lip so as to seal. As a result, in the case that the oil seal is normal, any air leakage is not sensed in the dust lip side, whereby it is possible to carry out a simple inspection in which the threshold value of the air leakage is set to zero.

Further, the dust is sealed as follows in the present invention.

More specifically, in the present invention, since the dust lip constructed by the rubber-like elastic body is provided in the external side of the main lip as mentioned above, the dust lip achieves the seal action so as to inhibit the dust from entering. Further, the intermediate lip is arranged between the main lip and the dust lip, the annular first projection is provided in the intermediate lip, and the first projection is provided with the structure which makes the dust hard to pass through to the lip end by forming the micro gap in relation to the outer peripheral surface of the tubular portion in the slinger. As a result, it is also possible to seal the dust on the basis of the labyrinth structure constructed by the micro gap of the first projection.

The intermediate lip is provided with the circumferentially partial second projection as well as the annular first projection, and the second projection is provided with the structure which properly keeps the micro gap of the first projection in the case that any eccentricity is generated in the rotary shaft by having the higher portion than the first projection. As a result, the labyrinth structure constructed by the micro gap of the first projection is structured such as to be prevented from being lost even in the case that any shaft eccentricity is generated.

Effect of the Invention

The present invention achieves the following effects.

More specifically, in the present invention, since the dust lip is constructed by the rubber-like elastic body which can be formed thin and tends to elastically deform in place of the fabric as described above, it is possible to reduce the sliding torque of the dust lip.

Further, in the case that the air leak inspection is carried out at the oil seal shipping time, the intermediate lip seals the air entering into the inner portion of the oil seal through the thread groove without reaching the dust lip. As a result, the air leakage is not sensed in the dust lip side as long as the oil seal is normal. Therefore, it is possible to carry out the simple inspection in which the threshold value of the air leakage is set to zero.

Further, the intermediate lip is arranged between the main lip and the dust lip, the annular first projection is provided in the intermediate lip, and the first projection is provided with the structure which makes the dust hard to pass through toward the lip end by forming the micro gap in relation to the slinger. As a result, it is possible to seal the dust on the basis of the labyrinth structure achieved by the micro gap of the first projection.

Further, the intermediate lip is provided with the circumferentially partial second projection together with the first projection, and the second projection is provided with the structure which properly keeps the micro gap of the first projection in the case that any eccentricity is generated in the rotary shaft by having the higher portion than the first projection. As a result, the labyrinth structure achieved by the micro gap of the first projection is hard to be lost even in the case that any shaft eccentricity is generated. Therefore, it is possible to seal the dust even in the case that the shaft eccentricity is generated.

DETAILED DESCRIPTION OF PREFERRED EMBODIMENT

Next, a description will be given of embodiment according to the present invention with reference to the accompanying drawings.

Figure 1:
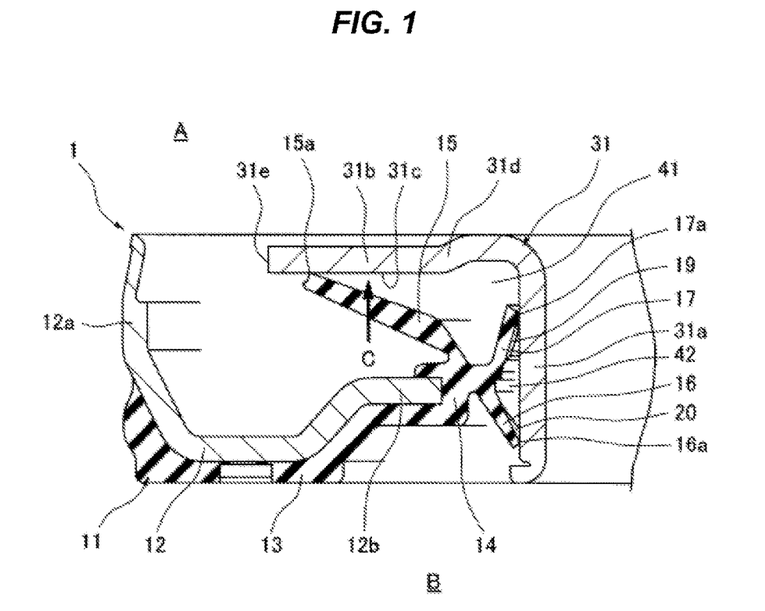
FIG. 1 is a cross sectional view of a substantial part of an oil seal according to an embodiment of the present invention.
Figure 2:
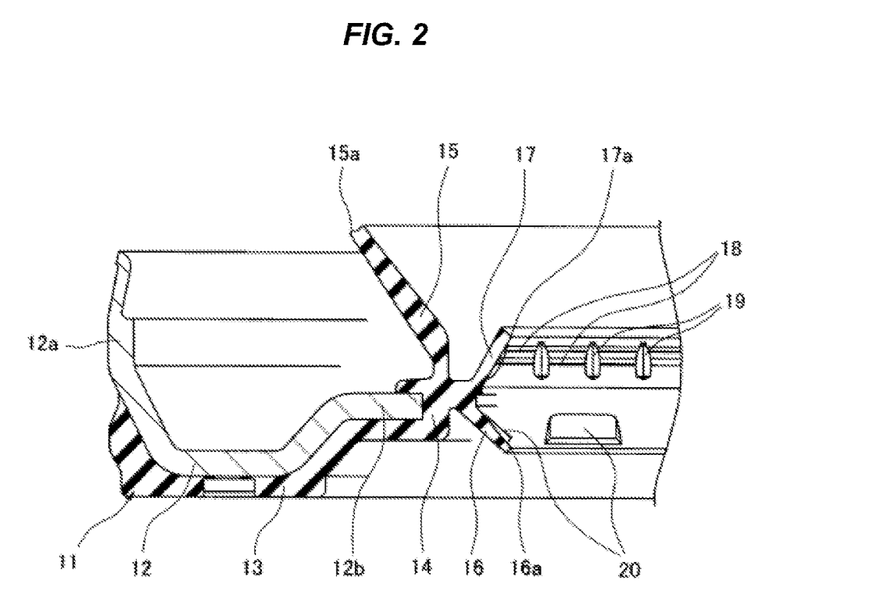
FIG. 2 is a cross sectional view of a substantial part and shows a state before a lip seal member in the oil seal is combined with a slinger.

FIG. 1 shows a cross section of a substantial part of an oil seal 1 according to an embodiment of the present invention, and FIG. 2 shows a state before a lip member 1 in the oil seal 1 is combined with a slinger 31.

The oil seal 1 shown in FIG. 1 is constructed by a combination of a lip seal member 11 which is fixed to an inner periphery of a shaft hole of a housing (not shown), and a slinger 31 which is fixed to a rotary shaft (not shown) inserted to the shaft hole, and inhibits a dust in an external side B from entering into a machine inner side A as well as inhibiting a sealed fluid in the machine inner side A from leaking to the external side B.

Figure 3:
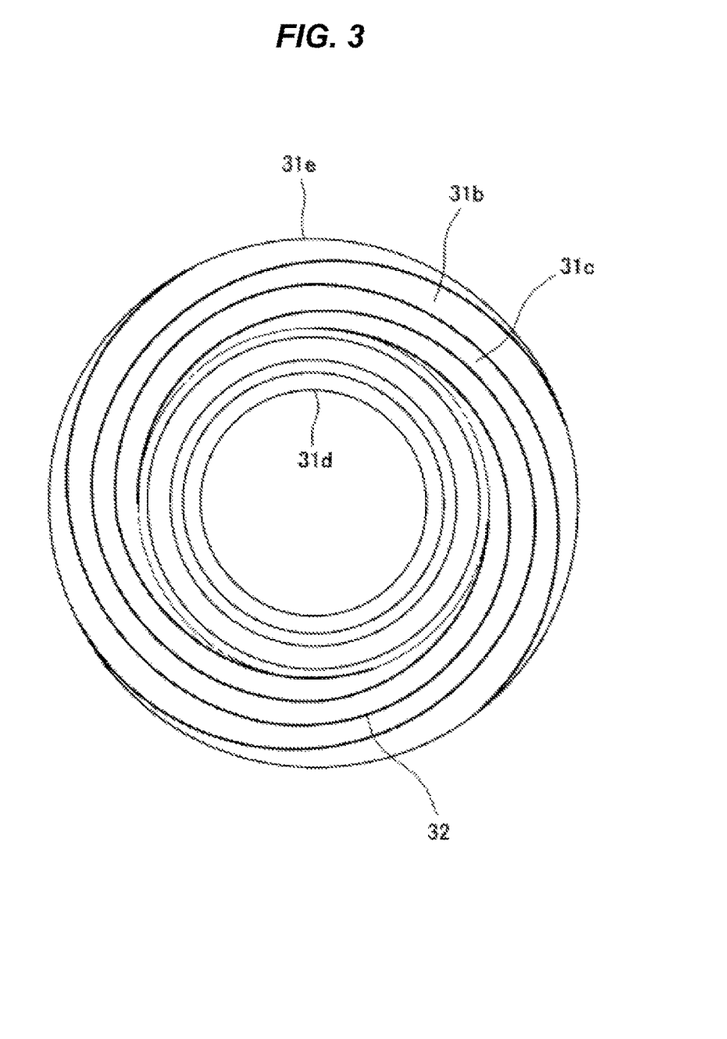
FIG. 3 is a view as seen from an arrow C in FIG. 1 and is an explanatory view of a thread groove in the oil seal.

The slinger 31 is constructed by a metal member, is obtained by integrally forming a flange portion 31b toward an outer side in a diametrical direction in a machine inner side end portion of a tubular portion 31a which is fitted to an outer peripheral surface of the rotary shaft, and is provided in an end surface 31c in the external side of the flange portion 31b with a thread groove 32 (refer to FIG. 3) which carries out a pumping action toward the outer side in the diametrical direction at the shaft rotating time. As shown in FIG. 3, the thread groove 32 is constructed by a right-hand four-threaded screw, that is, formed into a four-equally arranged groove which goes from an inner side (an inner diameter side) to an outer side (an outer diameter side) clockwise, and the thread groove 32 is provided in a range from a flection portion 31d to a leading end portion 31e in a flange portion 31b.

The lip seal member 11 is provided with an attachment ring 12, and a rubber-like elastic body 13 which is attached to the attachment ring 12. The attachment ring 12 is constructed by a metal member, and is obtained by integrally forming the flange portion 12b toward an inner side in a diametrical direction in an external side end portion of a tubular portion 12*a* which is fitted to an inner peripheral surface of a shaft hole of the housing. The rubber-like elastic body 13 is integrally provided with an attached rubber portion 14 which is attached to the attachment ring 12, a main lip (a side lip) 15 which slidably comes into close contact with the external side end surface 31*c* of the flange portion 31*b* in the slinger 31 while being supported to the attached rubber portion 14 so as to seal a sealed fluid, a dust lip 16 which is arranged in the external side of the main lip 15 while being supported to the attached rubber portion 14 in the same manner and slidably comes into close contact with an outer peripheral surface of the tubular portion 31*a* in the slinger 31 so as to suppress intrusion of a dust, and an intermediate lip 17 which is arranged at an intermediate position between the main lip 15 and the dust lip 16 while being supported to the attached rubber portion 14 in the same manner and slidably comes into close contact with the outer peripheral surface of the tubular portion 31*a* in the slinger 31.

Among them, the main lip 15 is provided with a lip end 15*a* in the machine inner side and diagonally toward an outer side in a diametrical direction, and slidably comes into close contact with the external side end surface 31*c* of the flange portion 31*b* in the slinger 31 over a whole periphery with the lip end 15*a*.

The dust lip 16 is provided with a lip end 16*a* in the external side and diagonally toward an inner side in the diametrical direction, and slidably comes into close contact with the inner peripheral surface of the tubular portion 31*a* in the slinger 31 over a whole periphery with the lip end 16*a*.

The inner peripheral surface of the dust lip 16 is provided with a plurality (for example, uniformly provided with three projections two by two) of circumferentially partial projections (third projections) 20 which slidably come into contact with the inner peripheral surface of the tubular portion 31*a* in the slinger 31, as shown in FIG. 2.

The intermediate lip 17 is provided with a lip end 17*a* in the machine inner side and diagonally toward the inner side in the diametrical direction, and slidably comes into close contact with the outer peripheral surface of the tubular portion 31*a* in the slinger 31 over a whole periphery with the lip end 17*a*.

An inner peripheral surface of the intermediate lip 17 is provided with the annular first projections 18 and the circumferentially partial second projections 19 as shown in FIG. 2.

Among them, the first projection 18 is provided with a structure which makes the dust hard to pass through to the lip end 17*a* by forming a micro gap (not shown) in relation to the outer peripheral surface of the tubular portion 31*a* in the slinger 31 without coming into contact with the outer peripheral surface of the tubular portion 31*a* in the slinger 31. A plurality (for example, two) of first projections 18 are concentrically provided. A cross sectional shape of the first projection 18 is formed into a triangular cross section.

The second projection 19 is provided with a structure which properly keeps the micro gap between the first projection 18 and the slinger 31 in the case that any eccentricity is generated in the rotary shaft by slidably coming into contact with the outer peripheral surface of the tubular portion 31*a* in the slinger 31 while having the higher portion than the first projection 18. More specifically, in the case that the second projection 19 is not provided, the micro gap between the first projection 18 and the slinger 31 is partially enlarged circumferentially in the case that the eccentricity is generated in the rotary shaft, and there is a risk that the labyrinth seal effect can not be achieved in the enlarged portion. However, since the second projection 19 is provided in the present embodiment, the following capacity to the shaft eccentricity of the intermediate lip 17 is improved. Therefore, the micro gap between the first projection 18 and the slinger 31 is not partially enlarged circumferentially, and the labyrinth seal effect can be maintained. A plurality of second projections 19 are uniformly provided. A cross sectional shape of the second projection 19 is formed into a triangular cross section, and the second projection 19 is formed into a ship bottom shape (a shape in which a height and a width are the greatest in the center portion in the longitudinal direction) extending in an axial direction as a whole. Further, the first projections 18 and the second projections 19 are provided so as to intersect each other.

The oil seal 1 having the structure mentioned above is used, for example, sealing around a shaft of a crank shaft in an automotive engine, and inhibits the dust in the external side B from entering into the machine inner side A as well as inhibiting the sealed fluid (the oil) in the machine inner side A from leaking to the external side B as mentioned above. Since the oil seal 1 is provided with the structure mentioned above, the following actions and effects can be achieved.

More specifically, in the oil seal 1 having the structure mentioned above, since the dust lip 16 is constructed by the rubber-like elastic body in place of the fabric, and the dust lip 16 constructed by the rubber-like elastic body can be formed thin and tends to elastically deform, the tense force can be reduced in spite of the same fastening margin as the fabric. Therefore, it is possible to reduce the sliding torque of the dust lip 16.

Further, in the oil seal 1 having the structure mentioned above, the disadvantage caused by the air discharge of the fabric is dissolved as follows.

More specifically, in the oil seal 1 having the structure mentioned above, since the thread groove 32 carrying out the pumping action toward the outer side in the diametrical direction is provided in the external side end surface 31*c* of the flange portion 31*b* in the slinger 31 as mentioned above, the excellent seal effect is applied to the sealed fluid in the machine inner side A. However, in the case that the thread groove 32 mentioned above is provided, the air flow passage is formed through the thread groove 32. Therefore, in the case that the air leak inspection is carried out at the shipping time of the oil seal 1, the air flowing in the air flow passage is sensed as the leakage.

In relation to this, in the oil seal 1 having the structure mentioned above, the intermediate lip 17 is arranged between the main lip 15 and the dust lip 16, and the intermediate lip 17 directs its lip end 17*a* to the machine inner side and comes into close contact with the slinger 31 over the whole periphery with the lip end 17*a*. Therefore, the intermediate lip 17 dams the air entering into the inner portion of the oil seal 1 through the thread groove 32 on the way without reaching the dust lip 16 so as to seal. As a result, in the case that the oil seal 1 is normal, any air leakage is not sensed in the dust lip 16 side, whereby it is possible to carry out a simple inspection in which the threshold value of the air leakage is set to zero.

Further, in the oil seal 1 having the structure mentioned above, the dust is sealed as follows.

More specifically, in the oil seal 1 having the structure mentioned above, since the dust lip 16 constructed by the rubber-like elastic body is provided in the external side of the main lip 15 as mentioned above, the dust lip 16 achieves the seal action so as to inhibit the dust from entering. Further, the intermediate lip 17 is arranged between the main lip 15 and the dust lip 16, the annular first projection 18 is provided in the intermediate lip 17, and the first projection 18 is provided with the structure which makes the dust hard to pass through to the lip end 17a by forming the micro gap in relation to the outer peripheral surface of the tubular portion 31a in the slinger 31. As a result, it is also possible to seal the dust on the basis of the labyrinth structure constructed by the micro gap of the first projection 18.

Further, the intermediate lip 17 is provided with the circumferentially partial second projection 19 as well as the annular first projection 18, and the second projection 19 is provided with the structure which properly keeps the micro gap of the first projection 18 in the case that any eccentricity is generated in the rotary shaft by having the higher portion than the first projection 18. As a result, the labyrinth structure constructed by the micro gap of the first projection 18 is structured such as to be prevented from being lost even in the case that any shaft eccentricity is generated. Therefore, it is possible to effectively seal the dust even in the case that the shaft eccentricity is generated.

Further, the projection portion 20 provided in the inner peripheral surface of the dust lip 16 also improves the following capacity to the shaft eccentricity of the dust lip 16 in the same manner.

In the embodiment mentioned above, the lip end 16a of the dust lip 16 is structured such as to slidably come into close contact with the outer peripheral surface of the tubular portion 31a in the slinger 31 over the whole periphery, however, it is possible to obtain the same effect as the advantage obtained by the air intake of the fabric mentioned above, by making the lip end 16a lift up from the slinger 31 while using the projection portion 20 as a spacer so as to set the micro gap between the lip end 16a and the slinger 31.

More specifically, in the oil seal 1 having the structure mentioned above, since the thread groove 32 carrying out the pumping action toward the outer side in the diametrical direction is provided in the external side end surface 31c of the flange portion 31b in the slinger 31, an excellent seal effect is achieved in relation to the sealed fluid in the machine inner side A. However, in the case that the thread groove 32 mentioned above is provided, the pressure in the space 41 between the main lip 15 and the intermediate lip 17 tends to be lowered and the negative pressure tends to be generated in connection with the pumping action of the thread groove 32 at the shaft rotating time, so that the main lip 15 tends to come into entire contact with the slinger 31.

On the contrary, in the oil seal 1 having the structure mentioned above, the micro gap is set between the lip end 16a of the dust lip 16 and the slinger 31 as mentioned above, and the projection portion 20 serving as the spacer is constructed by the circumferentially partial projection. As a result, the air (the atmospheric air) in the external side B flows into the space 42 between the dust lip 16 and the intermediate lip 17 via the gap between the micro gap and the projection portion 20 under the condition that the pressure in the space 41 between the main lip 15 and the intermediate lip 17 is lowered. Further, the intermediate lip 17 comes into close contact with the slinger 31 over the whole periphery with the lip end 17a, however, directs the lip end 17a to the machine inner side. As a result, in the case that the air (the atmospheric air) in the external side B flows into the space 42 between the dust lip 16 and the intermediate lip 17, the lip end 17a is expanded by the pressure, and the air (the atmospheric air) in the external side B flows into the space 41 between the main lip 15 and the intermediate lip 17. Therefore, since the air (the atmospheric air) in the external side B flows into the space 41 between the main lip 15 and the intermediate lip 17 according to the route mentioned above, it is possible to inhibit the pressure in the space 41 between the main lip 15 and the intermediate lip 17 from being extremely lowered and inhibit the negative pressure from being generated. As a result, it is possible to inhibit the main lip 15 from coming into entire contact with the slinger 31.

Further, the dust lip 16 is activated on the basis of the principle of leverage under the condition that the pressure in the space 41 between the main lip 15 and the intermediate lip 17 is lowered, without setting any normally open-type micro gap between the lip end 16a of the dust lip 16 and the slinger 31. As a result, the air (the atmospheric air) in the external side B can be flowed into the space 42 between the dust lip 16 and the intermediate lip 17, and further flowed into the space 41 between the main lip 15 and the intermediate lip 17. This is caused by the following actuations.

More specifically, under the condition that the pressure in the space 41 between the main lip 15 and the intermediate lip 17 is lowered, the pressure in the space 42 between the dust lip 16 and the intermediate lip 17 pushes open the intermediate lip 17 so as to flow into the space 41 between the main lip 15 and the intermediate lip 17, the space 42 being relatively higher pressure. As a result, the dust lip 16 is pressed to the outer peripheral surface of the tubular portion 21a in the slinger 21 by the atmospheric air pressure which is relatively higher pressure. At this time, the circumferentially partial projections 20 (for example, three projections uniformly arranged two by two) provided in the inner peripheral surface of the dust lip 16 act as a supporting point of the lever, and the lip end 16a acts as a point of application of the lever. As a result, the lip end 16a is separated from the outer peripheral surface of the tubular portion 21a in the slinger 21. Therefore, since the air (the atmospheric air) in the external side B flows into the space 42 between the dust lip 16 and the intermediate lip 17 and further flows into the space 41 between the main lip 15 and the intermediate lip 17, it is possible to inhibit the pressure in the space 41 between the main lip 15 and the intermediate lip 17 from being extremely lowered and inhibit the negative pressure from being generated. As a result, it is possible to inhibit the main lip 15 from coming into entire contact with the slinger 31. Since the projection portions 20 are circumferentially provided two by two, the projection portions are hard to be laterally shaky circumferentially. As a result, there is an effect of easily lifting up the lip end 16a on the basis of the principle of leverage. The lip end 16a is lifted up in its part circumferentially (the position where the projection portion 20 is provided), or is lifted up over the whole periphery.

What is claimed is:

1. An oil seal constructed by a combination of a lip seal member which is fixed to an inner periphery of a shaft hole of a housing and a slinger which is fixed to a rotary shaft inserted to the shaft hole, and inhibiting a dust in an external side from entering into a machine inner side as well as inhibiting a sealed fluid in the machine inner side from leaking to the external side, wherein the slinger is integrally provided with a tubular portion that is fixed to the rotary shaft and a flange portion that extends in a direction away from the tubular portion, the flange portion being provided with a thread groove that carries out a pumping action, and wherein the lip seal member is an elastic body that includes:

a main lip that is located directly adjacent the machine inner side, and that slidably contacts with the flange portion of the slinger so as to seal the sealed fluid;

a dust lip that is located on an external side of the main lip and that includes a projection; and an intermediate lip that is arranged at an intermediate position between the main lip and the dust lip, the intermediate lip extending in a direction toward the main lip such that a lip end of the intermediate lip and a lip end of the main lip are oriented in an opposite direction in comparison to a lip end of the dust lip, and the lip end of the intermediate lip contacts an outer peripheral surface of the tubular portion of the slinger over an entire periphery thereof, wherein the intermediate lip is provided with an annular first projection having a first height and a circumferentially partial second projection having a second height greater than the first height on a surface of the intermediate lip that faces the outer peripheral surface of the tubular portion of the slinger, the first height and the second height being relative to the surface of the intermediate lip that faces the outer peripheral surface of the tubular portion of the slinger, the first projection inhibits dust from passing the lip end of the intermediate lip while still allowing air to flow past the lip end of the intermediate lip by forming a micro gap relative to the outer peripheral surface of the tubular portion of the slinger without contacting the outer peripheral surface of the tubular portion of the slinger, the air flowing past the lip end of the intermediate lip occurring upon a drop in pressure in a space between the intermediate lip and the main lip, and the second projection maintains the micro gap when eccentricity is generated in the rotary shaft by having the second height that is greater than the first height of the first projection.

2. The oil seal according to claim 1, wherein the circumferentially partial second projection is arranged orthogonal to the annular first projection.

3. The oil seal according to claim 1, wherein the first projection forms the micro gap relative to the outer peripheral surface of the tubular portion without contacting the outer peripheral surface of the tubular portion along an entire length of the first projection.

4. The oil seal according to claim 1, wherein the projection of the dust lip has an elongated prism-shape.

5. The oil seal according to claim 1, wherein the second projection has a ship-bottom shape such that the height and a width of the second projection are greatest at a center portion in the longitudinal direction of the second projection.

6. The oil seal according to claim 5, wherein the projection of the dust lip has an elongated prism-shape including a length defined by a first pair of side sections that each extend in a circumferential direction of the dust lip and a width that defined by a second pair of side sections that each extend in a direction parallel with an axial length of the shaft, and the width of the second projection faces the first pair of side sections that each extend in the circumferential direction of the dust lip.

7. The oil seal according to claim 5, wherein the ship-bottom shape includes a first end that faces the lip end of the intermediate lip and a second end that faces the projection the dust lip, and a width of the second end is greater than that of the first end.

8. An oil seal constructed by a combination of a lip seal member which is fixed to an inner periphery of a shaft hole of a housing and a slinger which is fixed to a rotary shaft inserted to the shaft hole, and inhibiting a dust in an external side from entering into a machine inner side as well as inhibiting a sealed fluid in the machine inner side from leaking to the external side, wherein the slinger is integrally provided with a tubular portion that is fixed to the rotary shaft and a flange portion that extends in a direction away from the tubular portion, the flange portion being provided with a thread groove that carries out a pumping action, and wherein the lip seal member is an elastic body that includes:

a main lip that is located directly adjacent the machine inner side, and that slidably contacts with the flange portion of the slinger so as to seal the sealed fluid;

a dust lip that is located on an external side of the main lip and that includes a projection, the projection of the dust lip having an elongated prism-shape; and an intermediate lip that is arranged at an intermediate position between the main lip and the dust lip, the intermediate lip extending in a direction toward the main lip such that a lip end of the intermediate lip and a lip end of the main lip are oriented in an opposite direction in comparison to a lip end of the dust lip, and the lip end of the intermediate lip contacts an outer peripheral surface of the tubular portion of the slinger over an entire periphery thereof, wherein the intermediate lip is provided with an annular first projection having a first height and a circumferentially partial second projection having a second height greater than the first height on a surface of the intermediate lip that faces the outer peripheral surface of the tubular portion of the slinger, the first height and the second height being relative to the surface of the intermediate lip that faces the outer peripheral surface of the tubular portion of the slinger, and the second projection being arranged orthogonal to the first projection and having a ship-bottom shape such that the second height and a width of the second projection are greatest at a center portion in the longitudinal direction of the second projection, the first projection inhibits dust from passing the lip end of the intermediate lip while still allowing air to flow past the lip end of the intermediate lip by forming a micro gap relative to the outer peripheral surface of the tubular portion of the slinger without contacting the outer peripheral surface of the tubular portion of the slinger, the second projection maintains the micro gap when eccentricity is generated in the rotary shaft by having the second height that is greater than the first height of the first projection, the elongated prism-shape of the projection on the dust lip includes a length defined by a first pair of side sections that each extend in a circumferential direction of the dust lip and a width that defined by a second pair of side sections that each extend in a direction parallel with an axial length of the shaft, and the width of the second projection faces the first pair of side sections that each extend in the circumferential direction of the dust lip.

9. The oil seal according to claim 8, wherein the first projection forms the micro gap relative to the outer peripheral surface of the tubular portion without contacting the outer peripheral surface of the tubular portion along an entire length of the first projection.

10. The oil seal according to claim 8, wherein the ship-bottom shape includes a first end that faces a terminal end of the intermediate lip and a second end that faces the projection the dust lip, and a width of the second end is greater than that of the first end.

* * * * *